Sept. 20, 1927.
H. M. PFLAGER
CAR TRUCK
Filed July 14, 1926
1,642,891
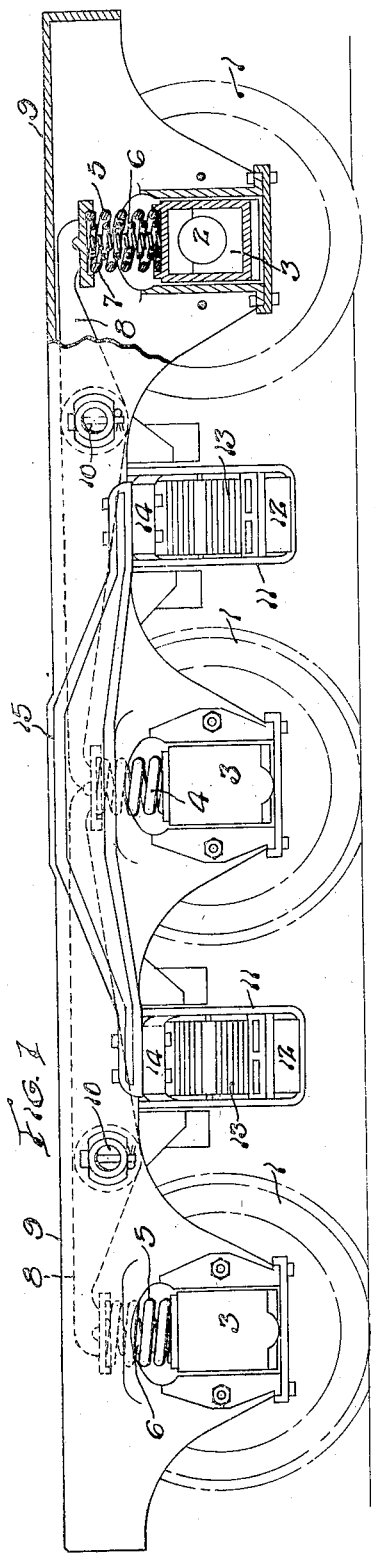
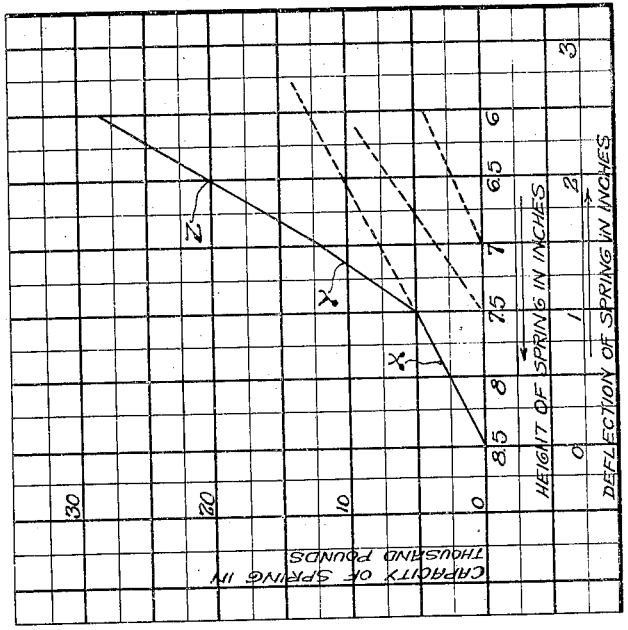
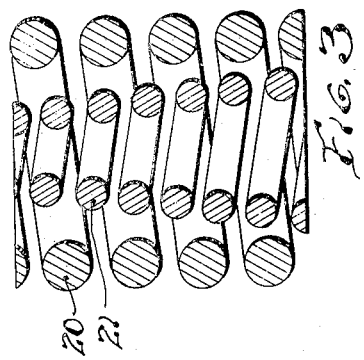
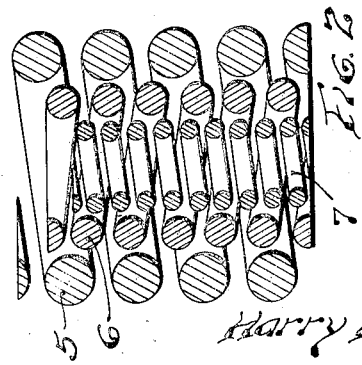
INVENTOR
Harry M. Pflager
BY Cornwall, Redell & James
ATTYS.

Patented Sept. 20, 1927.

1,642,891

UNITED STATES PATENT OFFICE.

HARRY M. PFLAGER, OF ST. LOUIS, MISSOURI, ASSIGNOR TO COMMONWEALTH STEEL COMPANY, OF GRANITE CITY, ILLINOIS, A CORPORATION OF NEW JERSEY.

CAR TRUCK.

Application filed July 14, 1926. Serial No. 122,374.

My invention relates to railway rolling stock and consists of an improved truck construction.

The general object of my invention is to provide a novel construction and arrangement of the elements between the axle journal boxes and the truck frame which will provide a yielding support for the latter but will eliminate the synchronizing of the spring motion which occurs with certain types of spring construction and arrangement now in use.

In the type of equalizer truck illustrated, the springs are mounted directly on the journal boxes and the equalizer rests on top of the springs and directly supports the truck frame and its load.

When a car truck runs along a track, especially at high speed, and a wheel strikes a rail joint or a high spot in the track, a blow is delivered to the nearest truck spring which compresses the spring to less than its normal working height. As the action and reaction of coil springs is practically uniform, there is a tendency to produce a series of vibrations in the spring and the vibration of more than one of the truck springs may be synchronized. These vibrations are transmitted to the car body and cause unsatisfactory riding conditions. As a train traveling from 40 to 60 miles an hour passes over several rail joints on each side of the track several times a second, this condition frequently sets up vibrations in one or more springs in which the springs, instead of absorbing a blow and decreasing the movement of the equalizer, truck and body resulting therefrom, add a movement produced by one shock to a vibratory movement produced by a previous shock thereby increasing the equalizer, frame and body movement. In other words, the springs may bound and rebound to increasing extent resulting in highly undesirable motion of the car body carried by the truck.

In order to overcome the conditions outlined above I have produced a composite spring with individual coils of various heights, so that as they are compressed or released the resistance of the composite spring increases or decreases non-uniformly for successive extents of movement of the spring supported element, thus changing the nature of the rebound of the spring from what would be experienced in the ordinary spring and avoiding the tendency to compress and release evenly throughout the entire spring movements, the oscillation of the ordinary spring arrangement depending on the blow, the load, and the size of the spring. With my spring arrangement the uniform vibration is broken up and I thereby prevent the setting up of synchronizing motion throughout the equalizing structure supporting the truck frame and the transmission of such motion to the car body.

A further development of my invention is to provide a spring in one part of the equalizing system which spring has a different period of vibration than possessed by a spring in another part of the system.

The improvements referred to above are illustrated in the accompanying drawings forming a part of my specifications, in which—

Figure 1 is a side elevation of a six wheel truck of the type in which straight equalizers are pivoted to the truck frame with their ends supported by springs carried on the axle journal boxes, the frame and associated structure being sectioned in part near one end for clearer illustration.

Figure 2 is a detail vertical section through a composite spring mounted over one of the journal boxes.

Figure 3 is a similar section illustrating a modified spring structure.

Figure 4 is a diagram illustrating the action of the composite spring detailed in Figure 2.

The truck shown in Figure 1 has the usual wheels 1, axles 2 and journal boxes 3. The central journal box is shown as carrying a single heavy coil 4 while each of the end journal boxes is shown as carrying a composite spring comprising individual coils 5, 6 and 7. Each of the equalizers 8 has one of its ends supported by the spring 4 on the central journal box and has its other end supported by the coils of the composite spring on one of the end journal boxes. Each equalizer is supported in the truck frame 9 preferably by a pin 10 passing through the equalizer and the side walls of the frame wheel piece. It will be understood that the truck frame has swing hangers 11 for supporting the spring planks 12 which carry leaf springs 13 on which rest the truck bolsters 14 which in turn support the car body bolsters (not shown) directly and through the side bearing arch 15 in the usual manner. Aside from the structure and arrangement of the springs over the journal boxes the details of the truck are well known and form no part of my present invention.

When either of the composite springs over the end journal boxes is under normal load as indicated in Figure 1, all the coils of the spring will be compressed somewhat, but as the free heights of the springs vary as indicated in Figure 2, which shows the springs without any load, and as indicated in the diagram of Figure 4 the ratio between the spring movement for each increase or decrease in the load varies as the different coils of the spring come into action or go out of action as indicated by the straight lines, X, Y and Z which illustrate the action of the composite spring. It will be understood that the dash lines indicate the normal action of each coil if the same was acting independently.

This action of the composite spring renders the spring resistance an uneven force instead of an even one and results in the dampening of the spring vibrations.

With respect to the changing condition in the composite spring it may be stated that the tensile stress in each coil does not vary in direct proportion to the height of the spring because of the fact that the initial compression of the respective springs occurs at different points in the movement of the spring supported element toward the element which mounts the spring. This results in the vibratory tendency being checked by such change beween the initial compressions of the spring.

If each of the composite springs is the same as the others, the vibratory motions will be dampened for the reasons given above. If the action of one of the journal box springs is different from the action of the adjacent journal box spring, as previously suggested, any variation likely to be produced by reaction of the springs to any shock or succession of shocks will be dampened, not only because of the different periods of vibration characteristic of the individual coils of one composite spring, if such are used, but will also be dampened by the different period of vibration possessed by the different springs over the adjacent journal boxes as neither of the springs supporting one equalizer can have any movement except when accompanied by corresponding movement of the spring structure at the other end of the equalizer.

In this connection, it will be understood that the free height of the coil or coils over one journal box may vary from the free height of the coil or coils over the adjacent journal box or boxes.

In this type of truck I contemplate the possible use of different spring structures on opposite sides of the truck. In this way the oscillation of a truck frame in a transverse vertical plane will be dampened even though all the springs on one side of the truck are alike. While such an arrangement does not appear to be as practical as the arrangement detailed above I have the same in mind as a possible modification of my invention.

In Figure 3 I illustrate a modified composite spring in which the free heights of the two coils 20 and 21 may be the same, but because of the tapered form of the inner coil 21 the resistance of the composite spring will, in result, resemble the resistance of the composite spring shown in Figure 2.

Other variations in the structure of the three coil composite spring consists in making any two coils higher than the third coil or in making any two of the coils of the same height but different from the third coil. The fact that the free heights of the coils are different does not necessarily mean that their solid heights are different. The solid heights may be different or the same. These and other modifications of the particular structure of a composite spring as well as variations in the arrangement of the cooperating composite spring, other than is indicated by Figure 1, will be suggested to those familiar with the art and I contemplate the exclusive use of such variations in the details of my invention as included in the scope of my claims.

I claim:

1. In a railway truck, spaced journal boxes, a spring structure on each of said boxes, the spring structure on one of said boxes having a different period of vibration under its load than the spring structure on another of said boxes.

2. In a railway truck, spaced journal boxes, a spring structure on each of said boxes, the spring structure on one of said boxes having a different free height than the spring structure on another journal box.

3. In a six wheel truck, axles, journal boxes thereon, spring structures on said journal boxes, equalizers each supported at its outer end on a spring structure on an end journal box and both supported at their inner ends on the spring structure on the middle box, the period of vibration of said end journal box spring structures being different from the period of vibration of the middle journal box spring structure, and a truck frame supported on said equalizers.

4. In a six wheel truck, axles, journal boxes thereon, spring structures on said journal boxes, equalizers each supported at its outer end on a spring structure on an end journal box and both supported at their inner ends on the spring structure on the middle box, at least one of said spring structures having a free height differing from the free height of the spring structure over the adjacent journal box.

5. In a six wheel truck, axles, journal boxes thereon, spring structures on said journal boxes, equalizers each supported at its outer end on a spring structure on an end journal box and both supported at their inner ends on the spring structure on the middle box, one of said spring structures consisting of a single coil and the other of said spring structures comprising a plurality of coils of different free heights.

6. In a six wheel truck, axles, journal boxes thereon, spring structures on said journal boxes, equalizers each supported at its outer end on a spring structure on an end journal box and both supported at their inner ends on the spring structure on the middle box, one of said spring structures consisting of a single coil and the other of said spring structures comprising a plurality of coils differing in free height from the free height of said single coil spring structure.

7. In a six wheel truck, axles, journal boxes thereon, spring structures on said journal boxes, equalizers each supported at its outer end on a spring structure on an end journal box and both supported at their inner ends on the spring structure on the middle box, one of said spring structures consisting of a single coil and the other of said spring structures comprising a plurality of coils differing in free height from each other and from the free height of said single coil.

In testimony whereof I hereunto affix my signature this 10th day of July, 1926.

H. M. PFLAGER.